United States Patent [19]

Abujudom et al.

[11] Patent Number: 4,836,496
[45] Date of Patent: Jun. 6, 1989

[54] SMF ACTUATOR

[75] Inventors: David N. Abujudom, Brookfield; Dennis E. Miller, Greendale, both of Wis.

[73] Assignee: Johnson Service Company, Milwaukee, Wis.

[21] Appl. No.: 90,236

[22] Filed: Aug. 27, 1987

[51] Int. Cl.[4] ...................... F16K 31/02; F16K 31/64
[52] U.S. Cl. ........................................ 251/11; 60/527; 60/528
[58] Field of Search .................... 251/11; 60/527, 529, 60/528

[56] References Cited

U.S. PATENT DOCUMENTS

| | | | |
|---|---|---|---|
| 3,121,315 | 2/1964 | Matthies | 251/11 X |
| 3,174,851 | 3/1965 | Buehler et al. | |
| 3,205,675 | 9/1965 | Matthies | 251/11 X |
| 3,403,238 | 4/1968 | Buehler et al. | |
| 3,613,732 | 7/1971 | Willson | |
| 4,268,006 | 5/1981 | Kunz et al. | 251/11 |
| 4,284,235 | 8/1981 | Diermayer et al. | 251/11 X |
| 4,472,113 | 9/1984 | Rogen | 60/527 X |
| 4,531,988 | 7/1985 | Todoroki et al. | |
| 4,570,852 | 2/1986 | Ohkata | |

FOREIGN PATENT DOCUMENTS 0077180  5/1984  Japan .
0146982  8/1985  Japan .

OTHER PUBLICATIONS

"Thermobimetallic Compositions Processing Properties", Bashnin et al, Moscow, Mashinos Aroeyeme, 1986.

*Primary Examiner*—Arnold Rosenthal
*Attorney, Agent, or Firm*—Andrus, Sceales, Starke & Sawall

[57] ABSTRACT

An SME actuator is provided by a housing (14), a plunger (12) axially reciprocal in the housing, a compression spring (16) or Belleville washers (60) biasing the plunger in one direction, SME (shape memory effect) disc washers (18) around the plunger and thermally deformable to move the plunger in the opposite direction, and a concentric electrical resistance heater (36) and/or fluid inlet and outlet ports (8, 10 or 86, 88) for thermally actuating the SME disc washers to in turn move the plunger. Multi-position control is provided by a stack of a plurality of SME Belleville disc washers of differing transition temperatures. Alternatively, the washers can all have the same transition temperature and operate proportionally with increasing or decreasing temperatures. Another version is provided by an SME torsion bar (96) and threaded drive element (104) for axially translating the plunger (112).

19 Claims, 2 Drawing Sheets

4,836,496

SMF ACTUATOR

BACKGROUND AND SUMMARY

The invention relates to SME, shape memory effect, actuator mechanisms.

SME alloys are known in the art and exhibit a given mechanical movement to a thermally deformed position in response to heating above a transition temperature. Upon cooling below the transition temperature, or below a hysteresis temperature with respect thereto, the SME element returns or is biased to return to its original position of repose. For further background regarding SME materials and actuating mechanisms, reference is made to Buehler et al U.S. Pat. No. 3,174,851, Buehler et al U.S. Pat. No. 3,403,238, Willson et al U.S. Pat. No. 3,613,732, Todoroki et al U.S. Pat. No. 4,531,988 and Ohkata U.S. Pat. No. 4,570,852, incorporated herein by reference, and to Watanabe Japanese Patent Document No. 0077180 and Nishibori Japanese Patent Document No. 0146982.

DETAILED DESCRIPTION

Figure 1:
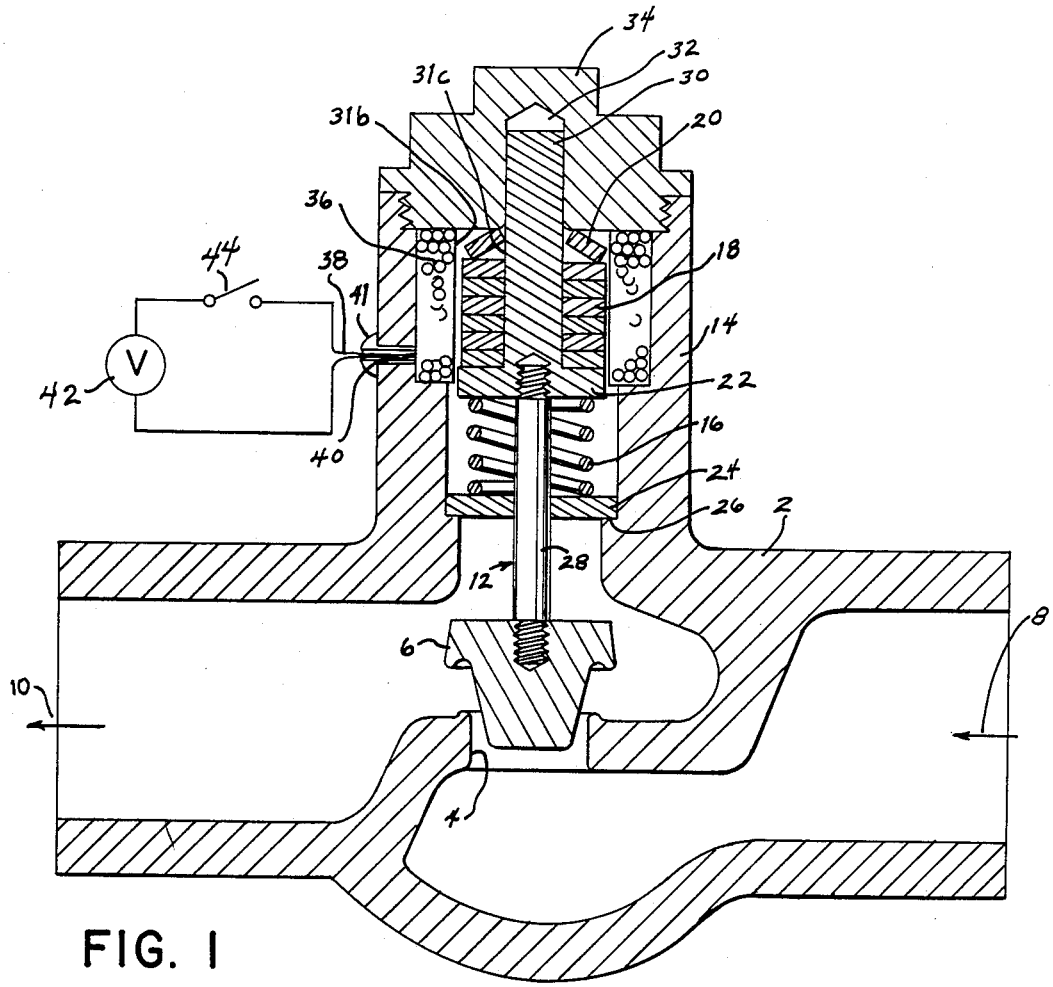
FIG. 1 is a sectional side view of an SME actuator constructed in accordance with the invention.

There is shown in FIG. 1 a valve 2 having an opening 4 engageable by valve plug 6 to terminate fluid flow from inlet 8 and outlet 10. Valve plug 6 is threadingly mounted to the bottom end of a plunger 12 which is axially vertically reciprocal in upstanding portion 14 of the housing. Compression spring 16 biases plunger 12 upwardly to the open condition of valve 2. A plurality of SME, shape memory effect, disc washers 18 thermally deform, by direct or indirect heating, FIG. 2, to move plunger 12 downwardly and close valve plug 6 by seating it in opening 4. SME disc washers 18 are of conventional SME alloy material available for example from Beta Phase Company, 1060 Marsh Road, Menlo Park, California 94025. At least one non-SME Belleville washer 20 is included in the stack and provides resiliency at the end of the travel stroke of the plunger upon thermal deformation of the SME disc washers.

Plunger 12 has a radially enlarged flange 22. Biasing spring 16 bears at its upper end against the underside of flange 22, and bears at its lower end against a stop washer 24 seated against shoulder 26 in the housing. The plunger includes a lower rod 28 of smaller diameter than flange 22 and threadingly connected to flange 22 and extending downwardly from flange 22 through stop washer 24. Biasing spring 16 is concentric to rod 28. The plunger also includes an upper rod 30 of smaller diameter than flange 22 and extending integrally upwardly from flange 22 through SME disc washers 18 and into an axial vertical guide bore 32 in top cap 34. Cap 34 is thread mounted to housing portion 14 to close the upper end thereof.

An electrical resistance heater is provided by an annular coil 36 concentric to SME stack 18 and having a pair of terminal wires 38 extending externally of the housing through aperture 40, sealed by epoxy 41, and in circuit with voltage source 42 and switch 44. Upon closure of switch 44, current from voltage source 42 flows through heater coil 36 which heats SME stack 18 such that the latter thermally deforms to the condition shown in FIG. 2. The close proximity of the heater coil to the SME stack provides thermal coupling therebetween.

Valve plug 6 may be actuated solely by the heat of resistance heater coil 36, or in combination with heating or cooling provided by the fluid from inlet 8. In the preferred embodiment, the SME stack is heated to a given temperature by fluid from inlet 8, and the SME stack is further heated by resistance coil heater 36 to a temperature above transition temperature, to actuate the valve, FIG. 2. Plunger 28, flange 22 and plunger 30 are heat conductive members and conduct heat from the fluid to the SME stack. Stop washer 24 is also a heat conductive member and/or may be provided with apertures through which the fluid may flow to directly contact the SME stack. In other embodiments, hot or cold fluids from inlet 8 may enhance or degrade heating of the SME stack and/or require less or more electrical current flow through heater coil 36 and/or faster or slower heating times. Spring 16 returns plunger 30 upwardly upon repose of the SME stack.

Figure 3:
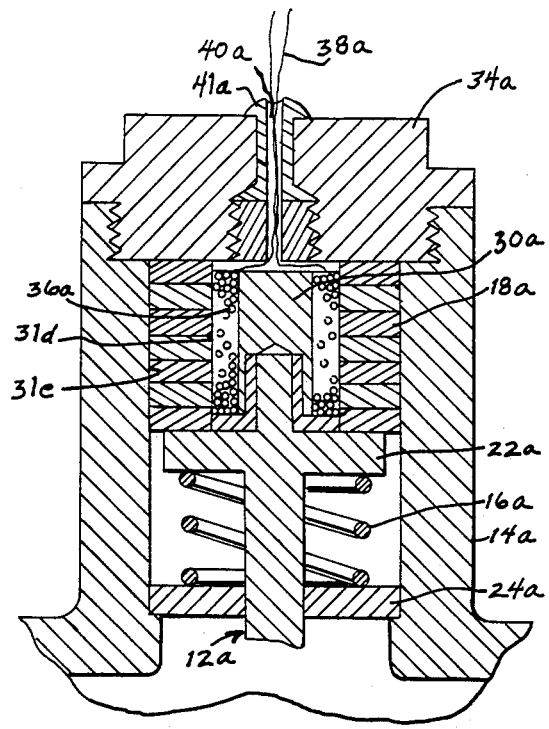
FIG. 3 shows an alternate embodiment of a portion of FIG. 1.

FIG. 3 shows an alternate embodiment of the actuator of FIG. 1 and uses like reference numerals with the postscript "a" where appropriate to facilitate clarity. Plunger 12a is axially vertically reciprocal in housing portion 14a. Compression spring 16a bears between stop washer 24a and flange 22a to bias the plunger upwardly. SME stack 18a bears against the top surface of flange 22a to drive the plunger downwardly upon thermal deformation of the SME stack. SME stack 18a bears at its upper end against the undersurface of cap 34a which is thread mounted to housing portion 14a. SME stack 18a is concentric to heater coil 36a which in turn is concentric to upper rod 30a of the plunger. The terminal wires 38a of the heater coil extend upwardly through an opening 40a in upper cap 34a and are sealed by epoxy 41a.

Figure 4:
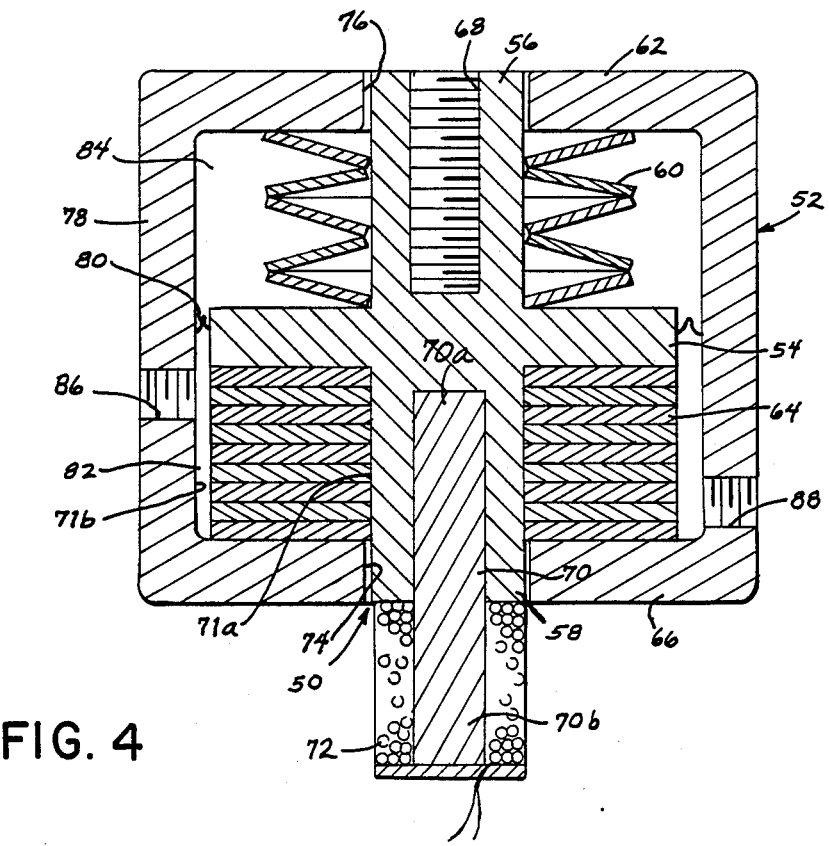
FIG. 4 shows another alternate embodiment of an SME actuator in accordance with the invention.

FIG. 4 shows another alternate embodiment. Plunger 50 is axially vertically reciprocal in housing 52. Plunger 50 includes a radially enlarged central flange 54, and a reduced diameter upper rod 56 extending upwardly from the flange, and a reduced diameter lower rod 58 extending downwardly from the flange. A plurality of Belleville washers 60 are concentric to upper rod 56 and bear between the top wall 62 of the housing and the upper surface of flange 54 to bias plunger 50 downwardly. A plurality of SME disc washers 64 are concentric to lower rod 58 and bear between the bottom housing wall 66 and flange 54 to move plunger 50 upwardly upon thermal deformation of the SME stack. Plunger 50 has actuated and nonactuated positions according to thermal deformation and repose of SME disc washers 64. Non-SME Belleville washers may be included in the stack to provide resiliency at the end of the travel stroke of the plunger upon thermal deformation of the SME disc washers. Upper rod 56 includes an internally threaded bore 68 for connection to a work-performing element. Lower rod 58 includes a heat conductor rod 70 therein. SME disc washers 64 are concentric to plunger rod 58 and to the upper portion 70a of heat conductor rod 70. An annular heater coil 72 is concentric to the lower portion 70b of rod 70 axially spaced below upper portion 70a. Bottom wall 66 of the housing has an opening 74 through which rods 58 and 70 extend. Upper rod portion 70a of the rod and SME disc washers 64 are internal to the housing. In the non-actuated position of the plunger as shown in FIG. 4, lower rod portion 70b and heater 72 are external to the housing. In the actuated position of the plunger, heater 72 and lower rod portion 70b move axially vertically upwardly through opening 74 and at least partially into the housing. Upper wall 62 of the housing has an opening 76 through which upper plunger rod 56 moves.

Housing 52 has a circumferential side wall 78 extending axially between the end walls and defining an internal cavity. A seal is provided by an annular bellows gasket 80 between flange 54 and the inner surface of side wall 78 such that axial vertical movement of flange 54 in the cavity defines a first variable volume chamber 82 containing SME disc washers 64 and sealed from a second inversely variable volume chamber 84 containing Belleville washers 60. Inlet and outlet ports 86 and 88 are provided through the housing walls for communicating fluid into and out of chamber 82 and providing direct fluid contact with SME disc washers 64. Fluid contact, and inlet 86 and outlet 88, are optional. Heat from heater coil 72 is conducted by rods 70 and 58 to heat SME disc washers 64 to thermally deform same. As an alternative to heat conductor rod 70, plunger rod 58 is itself a highly heat conductive member.

The SME Belleville disc washers may be directly heated with a low voltage source, in which case the bearing surfaces 31b and 31c, FIG. 1, 31d and 31e, FIG. 3, and 71a and 71b, FIG. 4, should be electrically non-conductive. The electrical resistance of the SME stack may be increased by adding electrically resistive washers or discs in series with the stack. Adding such elements within the stack may also be used to affect the force and stroke.

Multi-position control is provided by selecting SME Belleville disc washers with different transistion temperatures. In one embodiment in FIG. 2, parallel SME disc washers 19a and 19c each have a transition temperature T1 and form a first subset and are slanted in the same direction relative to plunger 30 therethrough. Parallel SME disc washers 19b and 19d have a transition temperature T2 and form a second subset, and are slanted oppositely to washers 19a and 19c. In this manner, the T2 disc washers are interleaved with and slant oppositely from the T1 disc washers. The T1 disc washers are spaced and separated by a T2 disc washers therebetween. Temperature T2 is higher than temperature T1, and the different transition temperatures provide multi-step multi-position movement of plunger 30. At temperatures below T1, plunger 30 and valve plug 6 are in the raised fully open condition. At temperatures between T1 and T2, the T1 disc washers 19a and 19c thermally deform, but not the T2 disc washers 19b and 19d, and plunger 30 and valve plug 6 are in a partially lowered partially open condition. At temperatures above T2, both the T1 disc washers 19a and 19c and the T2 disc washers 19b and 19d thermally deform, and plunger 30 and valve plug 6 are in the lower closed position. Additional SME disc washers can be included in each subset to lengthen the travel stroke of the plunger. Adding further subsets of SME disc washers of further differing transition temperatures adds further intermediate steps in the positioning of valve plug 6 along its vertical travel stroke, and provide a more smoothly continuous travel stroke, as desired.

Figure 2:
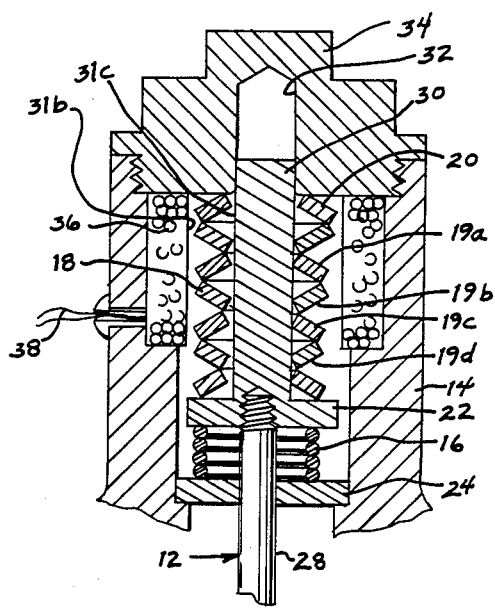
FIG. 2 is a sectional view of a portion of FIG. 1 showing an actuated condition.

In another embodiment in FIG. 2, disc washers 19a and 19b have a transition temperature T1 and form a first subset, and are contiguous to each other and slant in opposite directions. Disc washers 19c and 19d have a higher transition temperature T2 and form a second subset, and are contiguous to each other and slant in opposite directions. At temperatures below T1, valve plug 6 is fully open. At temperatures between T1 and T2, the first subset 19a and 19b thermally deforms to partially lower valve plug 6 to an intermediate position. At temperatures above T2, the second subset provided by disc washers 19c and 19d also thermally deforms to fully lower valve plug 6 to its closed position. Adding further subsets of disc washers of further differing transition temperatures provides further steps in the vertical travel stroke of valve plug 6.

In another embodiment, the SME disc washers all have the same transition temperature and operate proportionally with increasing or decreasing temperatures, to provide the above noted multi-position control.

Figure 5:
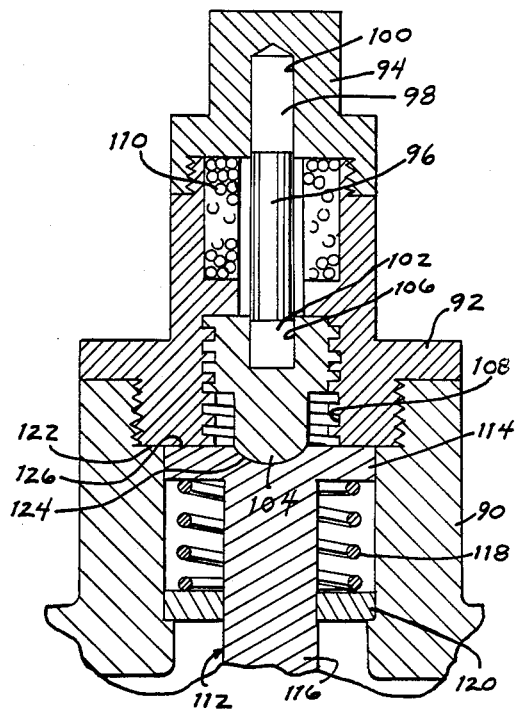
FIG. 5 shows another alternate embodiment of an SME actuator in accordance with the invention.

FIG. 5 shows another alternate embodiment. Housing 90 has an intermediate cap 92 thread mounted thereto. Intermediate cap 92 has a top cap 94 thread mounted thereto. An SME torsion bar 96 has an upper portion 98 of a given keyed configuration, such as a square or a hex, nonrotatably held in a like keyed configured bore 100 of housing cap 94. SME torsion bar 96 has a lower end 102 of a given keyed configuration nonrotatably received in a drive element 104 having a like keyed configuration inner bore 106. Housing cap 92 has an inner threaded bore 108. Drive element 104 is externally threaded, and is matingly received in threaded bore 108. An annular heater coil 110 is concentric to SME torsion bar 96. Upon heating, SME torsion bar 96 torsionally rotates threaded drive element 104 which in turn axially translates plunger 112 downwardly. Plunger 112 has a radially enlarged flange 114 and a reduced diameter lower rod 116 extending downwardly from the flange. Compression spring 118 is concentric to rod 116 and biases plunger 112 upwardly. Spring 118 bears at its upper end against the underside of flange 114 and at its lower end against a stop washer 120. Rod 116 extends through washer 120. Axially extending internally threaded passage 108 has an axial end face 122 defining an annular collar. The central portion 124 of the upper surface of flange 114 is axially aligned with and engaged by drive element 104. The radially outer portion 126 of the flange is axially aligned with annular collar 122 and engages the collar in the nonactuated position of the plunger.

It is recognized that various equivalents, alternatives and modifications are possible within the scope of the appended claims.

We claim:
1. An actuator comprising:
 housing means;
 plunger means reciprocally movable in said housing means;
 SME, shape memory effect, disc washer means around said plunger means and thermally deformable to move said plunger means along a travel stroke in a given direction, said SME disc washer means comprising a stack of a plurality of SME disc washers through which said plunger extends;
 at least one non-SME Belleville washer in said stack biasing said plunger means in a direction aiding said thermal deformation of said SME means in said given direction and providing bias and resiliency at the end of the travel stroke of said plunger means upon thermal deformation of said SME disc washers.

2. The invention according to claim 1 comprising return biasing means biasing said plunger means in a direction opposite said given direction upon repose of said SME disc washers.

3. The invention according to claim 2 wherein said plunger means moves axially in said housing means and has a radially enlarged flange, and wherein said return biasing means bears against one side of said flange, and said SME disc washer means bears against the other side of said flange.

4. The invention according to claim 3 wherein said plunger means includes a rod of smaller diameter than said flange and extending axially from said other side of said flange.

5. The invention according to claim 4 wherein said plunger means includes a second rod of smaller diameter than said flange and extending axially from said one side of said flange, and wherein said return biasing means is concentric to said second rod.

6. The invention according to claim 1 comprising an electrical resistance heater thermally coupled to said SME disc washer means for heating said SME disc washer means.

7. The invention according to claim 6 wherein said heater comprises an annular member concentric to said SME disc washer means.

8. An actuator comprising:
housing means;
plunger means reciprocally movable in said housing means;
SME, shape memory effect, disc washer means around said plunger means and thermally deformable to move said plunger means in a given direction;
means for returning said plunger means in a direction opposite said given direction upon repose of said SME disc washer means;
wherein said return means comprises biasing means biasing said plunger means in said opposite direction,
and wherein:
said plunger means moves axially in said housing means and has a radially enlarged flange and first and second rods extending axially from opposite sides of said flange;
said housing means has first and second distally opposite end walls, said second end wall having an opening therein through which said second rod extends;
said biasing means is concentric to said second rod and bears between said second end wall and said flange;
said SME disc washer means is concentric to said first rod and bears between said first end wall and said flange.

9. The invention according to claim 8 wherein said first end wall has an opening therein through which said first rod extends.

10. An actuator comprising:
housing means;
plunger means reciprocally movable in said housing means;
a stack of a plurality of SME, shape memory effect, disc washers around said plunger means and thermally deformable to move said plunger means, at least one SME disc washer in said stack having a different transition temperature than another SME disc washer in said stack to provide multi-position movement of said plunger means.

11. The invention according to claim 10 wherein said stack includes one or more SME disc washers each having a transition temperature T1, and one or more SME disc washers each having a transition temperature T2 different than T1.

12. The invention according to claim 11 wherein T2 is higher than T1, and wherein said plunger means has a first position at temperatures less than T1, a second position at temperatures between T1 and T2, and a third position at temperatures greater than T2, said second position being between said first and third positions.

13. The invention according to claim 12 wherein said T1 disc washers are parallel and slanted relative to said plunger means therethrough, and wherein said T2 disc washers are parallel and slanted oppositely to said T1 disc washers relative to said plunger means therethrough, said T2 disc washers being interleaved with said T1 disc washers, such that a T1 disc washer is spaced from the next T1 disc washer by a T2 disc washer therebetween which slants oppositely to said T1 disc washers.

14. The invention according to claim 12 wherein said T1 disc washers are contiguous to each other and alternately slant oppositely relative to plunger means therethrough and form a first subset along plunger means, and wherein said T2 disc washers are contiguous to each other and alternately slant oppositely relative to said plunger means therethrough and form a second subset along said plunger means, such that at temperatures between T1 and T2 said first subset is thermally deformed to move said plunger means to said second position, and at temperatures above T2 both of said first and second subsets are thermally deformed to move said plunger means to said third position.

15. An actuator comprising:
housing means;
plunger means reciprocally movable in said housing means;
SME, shape memory effect, means in said housing means and thermally deformable to move said plunger means along a travel stroke in a given direction;
means biasing said plunger means in the same direction as said given direction aiding said thermal deformation of said SME means and providing bias and resiliency at the end of said travel stroke along said given direction upon said thermal deformation.

16. The invention according to claim 15 comprising return biasing means for returning said plunger means in a direction opposite said given direction against said first mentioned biasing means upon repose of said SME means.

17. The invention according to claim 15 comprising electrical resistance heater means thermally coupled to said SME means for heating said SME means, wherein said SME means and said heater means are separate elements and are both around said plunger means.

18. The invention according to claim 15 wherein said SME means comprises SME disc washer means.

19. The invention according to claim 10 wherein said SME disc washers in said stack are thermally deformable to move said plunger means along a travel stroke in a given direction, and comprising at least one non-SME Belleville washer in said stack biasing said plunger means in a direction aiding said thermal deformation of said SME disc washers in said given direction and providing bias and resiliency at the end of the travel stroke of said plunger means upon thermal deformation of said SME disc washers.

* * * * *

UNITED STATES PATENT AND TRADEMARK OFFICE
CERTIFICATE OF CORRECTION

PATENT NO. : 4,836,496

DATED : June 6, 1989

INVENTOR(S) : DAVID N. ABUJUDOM ET AL

It is certified that error appears in the above-identified patent and that said Letters Patent is hereby corrected as shown below:

Cover Sheet at "(54)" delete "SMF" and substitute therefore -- SME --; Column 1, Line 2, delete "SMF" and substitute therefore -- SME --; Column 1, Line 37, after "8" delete "and" and substitute therefore -- to --.

Signed and Sealed this

Twenty-seventh Day of November, 1990

Attest:

HARRY F. MANBECK, JR.

*Attesting Officer*      *Commissioner of Patents and Trademarks*